US00RE41553E

(19) United States
(12) Reissued Patent
Nikolovski et al.

(10) Patent Number: US RE41,553 E
(45) Date of Reissued Patent: Aug. 24, 2010

(54) STRIP CASTING APPARATUS

(75) Inventors: Nikolco S. Nikolovski, Figtree (AU); Harold Roland Kaul, Mt. Ousley (AU)

(73) Assignee: Castrip LLC, Charlotte, NC (US)

(21) Appl. No.: 11/649,925

(22) Filed: Jan. 4, 2007

Related U.S. Patent Documents

Reissue of:
(64) Patent No.: 6,837,301
Issued: Jan. 4, 2005
Appl. No.: 10/104,313
Filed: Mar. 22, 2002

U.S. Applications:

(63) Continuation-in-part of application No. 09/495,356, filed on Feb. 1, 2000, now abandoned.

(30) Foreign Application Priority Data

Feb. 5, 1999 (AU) ..... PP8526

(51) Int. Cl.
*B22D 11/06* (2006.01)

(52) U.S. Cl. ..... 164/480; 164/442
(58) Field of Classification Search ..... 164/480, 164/442, 448, 418
See application file for complete search history.

(56) References Cited

U.S. PATENT DOCUMENTS

| | | | | |
|---|---|---|---|---|
| 2,796,781 | A | 6/1957 | Mills | |
| 4,261,190 | A | 4/1981 | Fapiano | |
| 4,702,300 | A | 10/1987 | Nakanori et al. | |
| 5,706,882 | A | 1/1998 | Fellus et al. | |
| 5,927,375 | A * | 7/1999 | Damasse et al. | 164/451 |
| 6,167,942 | B1 | 1/2001 | Fish et al. | |
| 6,167,943 | B1 | 1/2001 | Fish et al. | |
| 2007/0006625 | A1 | 1/2007 | Reinschke | |

FOREIGN PATENT DOCUMENTS

| | | |
|---|---|---|
| DE | 27 43 130 | 6/1978 |
| EP | 903190 | 3/1999 |
| JP | 60145253 | 7/1985 |
| JP | 61-001418 | 1/1986 |
| JP | 61-049722 | 3/1986 |
| JP | 05261486 | 10/1993 |
| JP | 06-106305 | 4/1994 |
| JP | 10-305352 | 11/1998 |
| KR | 2003-054637 | 7/2003 |
| WO | 2005/035156 | 4/2005 |

OTHER PUBLICATIONS

ISR_PCTAUX2007000289.
European Search Report_US62503107.
Patent Abstract of Japan, vol. 018, No. 023 (M–1541) Jan. 14, 1994 & JP05 261486 A (Hitachi Ltd.; others:01) Oct. 12, 1993; "Continuous Casting Apparatus for Strip"; Inventor: Yasmashita Shinighi.*
Patent Abstract of Japan, vol. 009, No. 311 (M–346); Dec. 7, 1985; & JP 60 145253 A (Mitsubishi Jukogyo KK), Jul. 31, 1985; "Method for Exchanging Water Cooled Casting Roll in Continuous Casting Device"; Inventor: Tanif Masaj–Une.*
* cited by examiner

*Primary Examiner*—Kevin P Kerns
(74) *Attorney, Agent, or Firm*—Arland T. Stein; Hahn, Loeser & Parks, LLP

(57) ABSTRACT

Twin roll strip caster comprising parallel casting rolls one of which is mounted on moveable roll supports which allow it to move bodily toward and away from the other roll. A pair of roll biasing units comprising compression act on roll supports to bias the moving roll toward the other roll. Biasing units comprise compression springs acting on roll supports through thrust transmission structures and thrust reaction structures. The positions of thrust reaction structures are set by hydraulic cylinder units operable to vary the position of each reaction structure to replicate movements of the respective thrust transmission structure so as to maintain a constant compression of the biasing springs regardless of lateral movements of the roll supports.

18 Claims, 7 Drawing Sheets

STRIP CASTING APPARATUS

Matter enclosed in heavy brackets [ ] appears in the original patent but forms no part of this reissue specification; matter printed in italics indicates the additions made by reissue.

RELATED PATENT APPLICATIONS

This application is a continuation-in-part of U.S. application Ser. No. 09/495,356, filed Feb. 1, 2000, *now abandoned,* which claims priority to Australian Provisional Patent Application PP8526, filed Feb. 5, 1999.

BACKGROUND AND SUMMARY OF THE INVENTION

This invention relates to the casting of metal strip. It has particular application to the casting of metal strip by continuous casting in a twin roll caster.

In a twin roll caster molten metal is introduced between a pair of contra-rotated horizontal casting rolls which are cooled so that metal shells solidify on the moving roll surfaces and are brought together at the nip between them to produce a solidified strip product delivered downwardly from the nip between the rolls. The term "nip" is used herein to refer to the general region at which the rolls are closest together. The molten metal may be poured from a ladle into a smaller vessel or series of smaller vessels from which it flows through a metal delivery nozzle located above the nip so as to direct it into the nip between the rolls, so forming a casting pool of molten metal supported on the casting surfaces of the rolls immediately above the nip and extending along the length of the nip. This casting pool is usually confined between side plates or dams held in sliding engagement with end surfaces of the rolls so as to dam the two ends of the casting pool against outflow, although alternative means such as electromagnetic barriers have also been proposed.

The setting up and adjustment of the casting rolls in a twin roll caster is a significant problem. The rolls must be accurately set to properly define an appropriate width for the nip, generally of the order of a few millimeters or less, and there must also be some means for allowing at least one of the rolls to move outwardly against a biasing force to accommodate fluctuations in strip thickness particularly during start up.

Usually, one of the rolls is mounted in fixed journals and the other is rotatably mounted on supports which can move against the action of biasing means to enable that roll to move laterally to accommodate fluctuations in strip thickness. The biasing means may be in the form of helical compression springs or alternatively, may comprise a pair of pressure fluid cylinder units.

A strip caster with spring biasing of the laterally moveable roll is disclosed in U.S. Pat. No. 6,167,943 to Fish et al. In that case the biasing springs act between the roll supports and a pair of thrust reaction structures, the positions of which can be set by operation of a pair of powered mechanical jacks to enable the initial compression of the springs to be adjusted to set initial compression forces which are equal at both ends of the roll. The positions of the roll supports need to be set and subsequently adjusted after commencement of casting so that the gap between the rolls is constant across the width of the nip in order to produce a strip of constant profile. However, as casting continues the profile of the strip will inevitably vary due to eccentricities in the rolls and dynamic changes due to variable heat expansion and other dynamic effects. Previously, there has been no means to provide dynamic wedge or profile control to suppress strip profile fluctuations during casting. By the present invention, it is possible to provide a very effective means for such dynamic profile control.

A related problem dealing with variations due to eccentricities in the casting rolls where changes in the casting speed causes variation in strip thickness. There is a need to provide a means to maintain a substantially constant force by the rolls against the strip irrespective of the variation in thickness of the strip during production. By the present invention, it is possible provide an effective means for providing a substantially constant force by the rolls on the strip during casting with variation in the strip thickness.

The present invention is an improvement in an apparatus for continuously casting metal strip where a pair of parallel casting rolls form a nip between them, a metal delivery system delivers molten metal into the nip between the rolls to form a casting pool of molten metal supported on casting roll surfaces immediately above the nip confined against outflow adjacent the ends of the nip, and a casting roll drive system drives the casting rolls in counter-rotational directions to produce a solidified strip of metal delivered downwardly from the nip.

The improvement of the present invention provides for controlling thickness of the strip against variation during casting and comprises sensors positioned downstream of the nip capable of sensing the strip thickness at a plurality of locations across the strip, said sensor capable of producing electrical signals indicative of the strip thickness sensed at the sensor positions, at least one of the casting rolls supported on a roll carrier capable of allowing one of the casting rolls to move laterally toward and away from the other casting roll, carrier drives capable of moving roll carriers and in turn varying the strip thickness of the strip across the strip at the nip, and a control system capable of controlling the carrier drive's response to electrical signals from the sensors to vary the thickness of the strip at the nip to at least partially correct for variations in the strip thickness sensed by the sensors.

The roll carriers may be positioned adjacent to each end of the moveable casting roll and capable of moving independently of each other. The carrier drives may be comprised of servo mechanisms capable of independently moving the roll carriers so as to vary the strip thickness across the width of the strip at the nip, or comprised of roll biasing units each acting on the roll carrier at each end of the casting rolls to bias the casting roll bodily toward the other casting roll so as to vary the strip thickness across the strip at the nip.

Where the carrier roll system is comprised of roll biasing units, each roll biasing unit may be comprised of thrust transmission structures connected to the roll carriers at each end of the casting rolls, compression springs acting against the thrust structure to exert force on the thrust transmission structure and in turn the roll carriers at each end of the casting roll, and a thrust reaction setting device operable to vary the lengths of the compression springs. In this embodiment, the control system may control operation of the thrust reaction setting device such that movement of the thrust transmission structure moves the roll carriers and in turn varies the strip thickness across the strip at the nip. More specifically, each roll biasing unit may in addition comprise a thrust reaction structure abutting the compression spring and moveable by the thrust reaction setting device such that the control system varies the position of the thrust reaction structure to exert force against the compression spring and through the thrust transmission structure to vary the strip thickness across the strip at the nip.

Irrespective of the embodiment, the carrier drives may be disconnectable from the roll carriers to enable a module comprised of the casting roll and the roll carrier to be moveable without removing or dismantling the carrier drives.

In an alternative or supplement to the above-described invention, the improvement of controlling thickness of the strip against variation during casting may comprise at least one of the casting rolls mounted on roll carriers capable of allowing one of the casting rolls to move laterally toward and away from the other casting roll, roll biasing units each acting on the roll carrier at each end of the one casting roll to bias the one casting roll bodily toward the other casting roll, each roll biasing unit comprising thrust transmission structures connected to the roll carriers at each end of the casting rolls, compression springs acting against the thrust transmission structure to exert force on the thrust transmission structure and in turn the roll carriers at each end of the casting roll, a thrust reaction structure capable of compressing the compression spring and moveable axially of the compression spring, a thrust reaction structure setting device operable to vary the position of the thrust reaction structure relative to the compression spring, and a control system capable of controlling operation of the setting thrust reaction device such that movements of the thrust reaction structure replicate movements of the thrust transmission structure whereby movements of the thrust reaction structure do not significantly affect the biasing force exerted on the roll carrier and casting roll by the compression spring.

In a preferred illustrative embodiment of the present invention, at least one of the casting rolls may be mounted on a pair of moveable roll carriers which allow one roll to move bodily toward and away from the other roll, and there may be a pair of roll biasing units acting one on each of the pair of moveable roll carriers to bias said one roll bodily toward the other roll. Each roll biasing unit may comprise a thrust transmission structure connected to the respective roll carrier, a thrust reaction structure, and a compression spring acting between spring abutments on the thrust reaction structure and the thrust transmission structure to exert a thrust on the thrust transmission structure and the respective roll carrier. A thrust reaction structure setting device is operable to vary the position of the thrust reaction structure, and a control system is provided to control operation of the setting device such that movements of the thrust transmission structure are replicated as movements of the thrust reaction structure whereby movements of the thrust transmission structure do not significantly affect the biasing force imposed thereon by the compression spring.

Preferably, the thrust reaction structure setting device is a pressure fluid actuable device acting between the thrust reaction structure and a fixed structure. The pressure fluid actuable device may be provided by a fluid cylinder and piston unit connected at one end to a fixed structure, the other end of the piston unit either forming or being connected with the thrust reaction structure.

To provide dynamic wedge control, the sensors are positioned at a plurality of locations across the width of the strip, and the control system is capable of controlling the carrier drives responsive to the electrical signals from the sensors to vary thickness of the strip across its width at the nip to at least partially correct for variations in the strip thickness sensed by the sensors.

Alternatively, to maintain a substantially constant force on the strip, the control system controls operation of the setting thrust reaction device such that movements of the thrust reaction structure replicate movements of the thrust transmission structure.

The control system is capable of controlling operation of the setting thrust reaction device such that movements of the thrust reaction structure replicate movements of the thrust transmission structure whereby movements of the thrust transmission structure do not significantly affect the biasing force imposed on the roll carrier and casting roll by the compression spring. The control system may comprise a first position sensor to sense the position of the thrust transmission structure, and to operate the fluid pressure actuable device such that a movement sensed by the sensor is replicated by a movement of the thrust reaction structure.

The roll carriers may comprise a pair of roll end support structures for each of the casting rolls disposed generally beneath the ends of the respective casting roll. Each pair of roll end support structures may carry journal bearings mounting the respective roll ends for rotation about a central roll axis.

The casting rolls and roll carriers may be mounted in a roll module installed in and removable from the caster as a unit. In that case, the thrust transmission structure of each carrier drive may be disconnectable from the respective roll carrier to enable the module to be removed without removing or dismantling the carrier drives.

In an apparatus in accordance with the invention both of the roll carriers and supported casting rolls may be moved laterally by respective pairs of carrier drives. Alternatively, one of the rolls may be restrained against lateral bodily movement and the other allowed to move laterally against forces in accordance with the invention.

BRIEF DESCRIPTION OF THE DRAWINGS

In order that the invention may be fully explained, particular embodiments will be described in some detail with reference to the accompanying drawings in which.

DETAILED DESCRIPTION OF THE DRAWINGS

Figure 1:
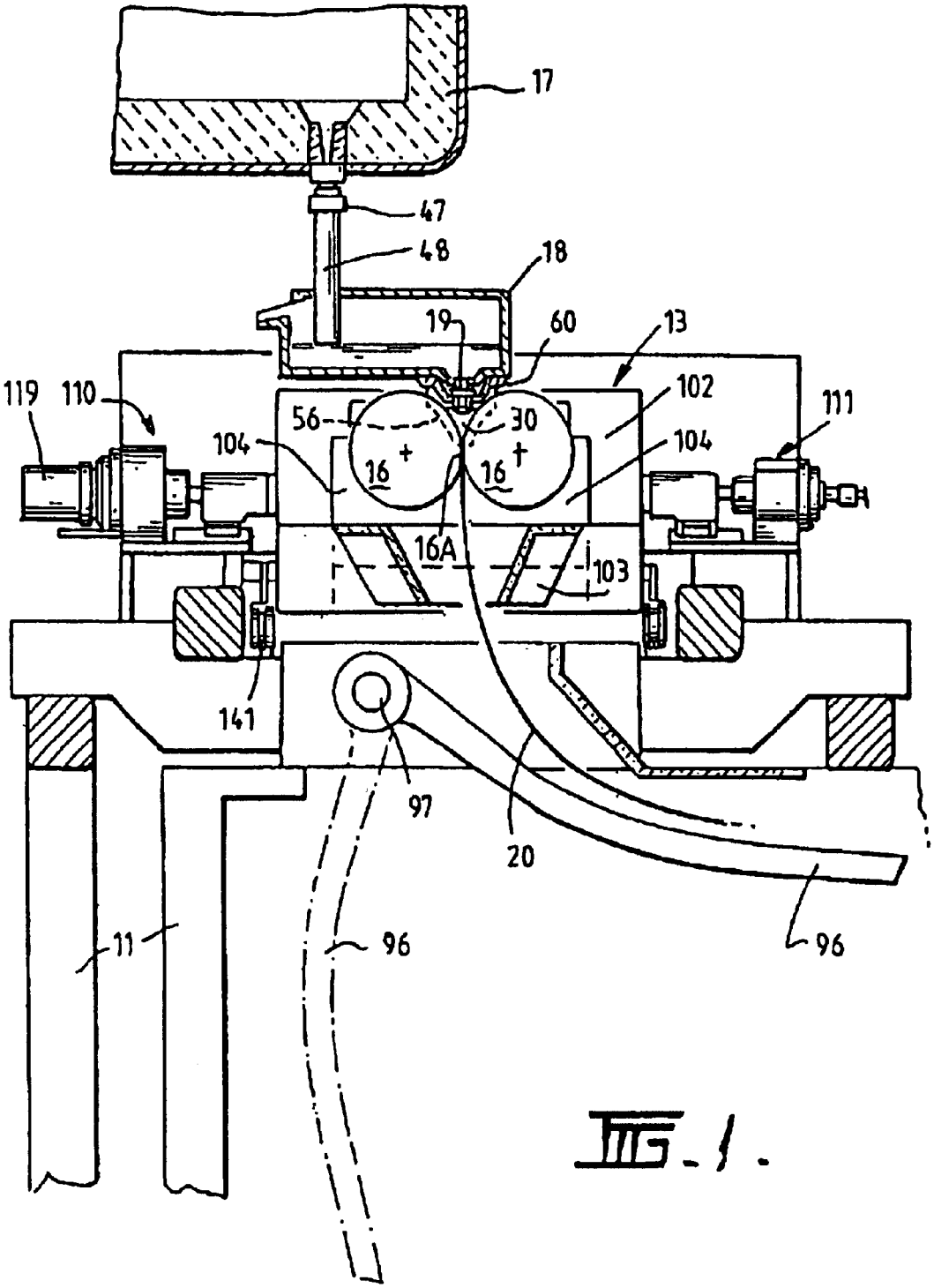
FIG. 1 is a vertical cross section through a strip caster constructed in accordance with the present invention.
Figure 2:
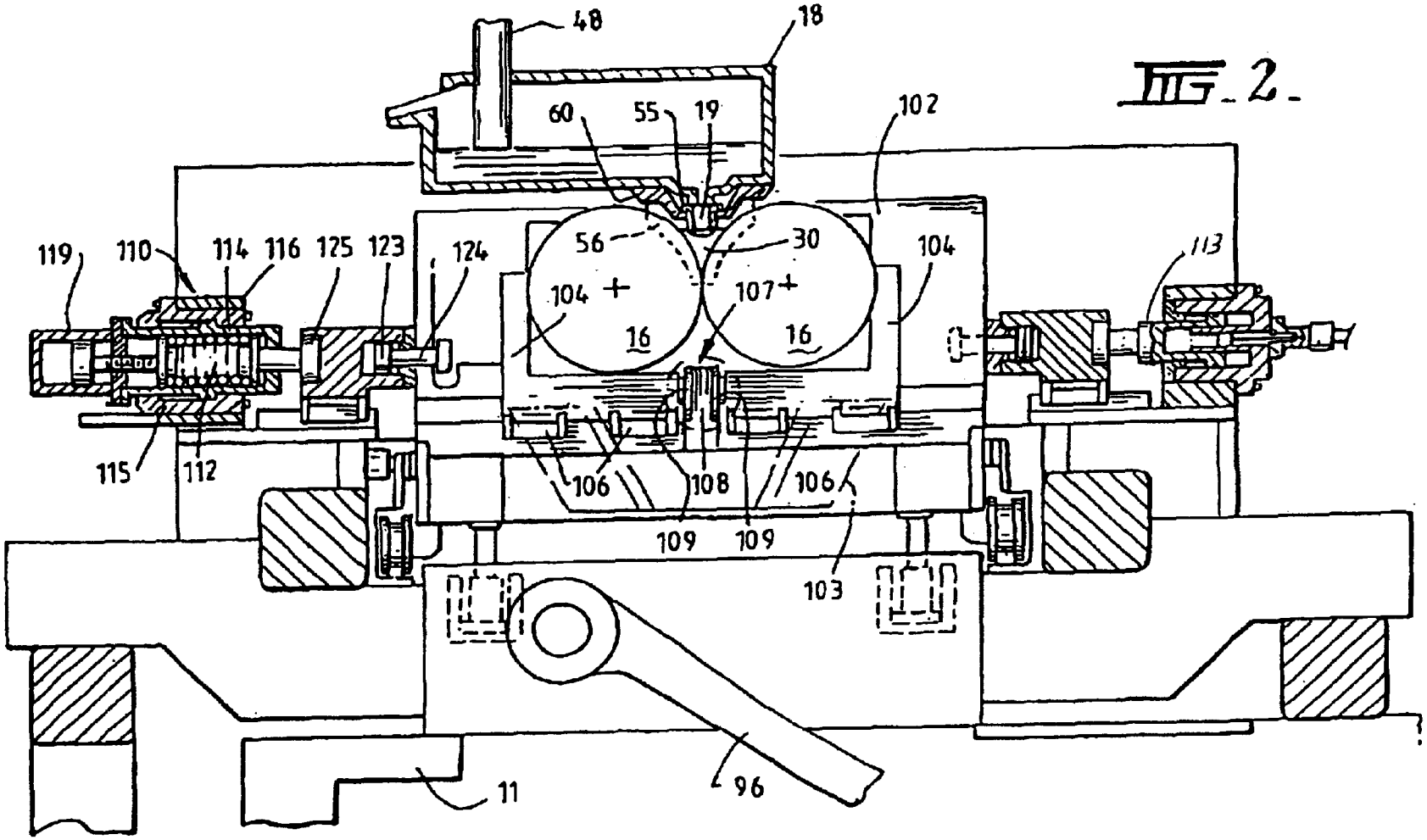
FIG. 2 is an enlargement of part of FIG. 1 illustrating important components of the caster.
Figure 3:
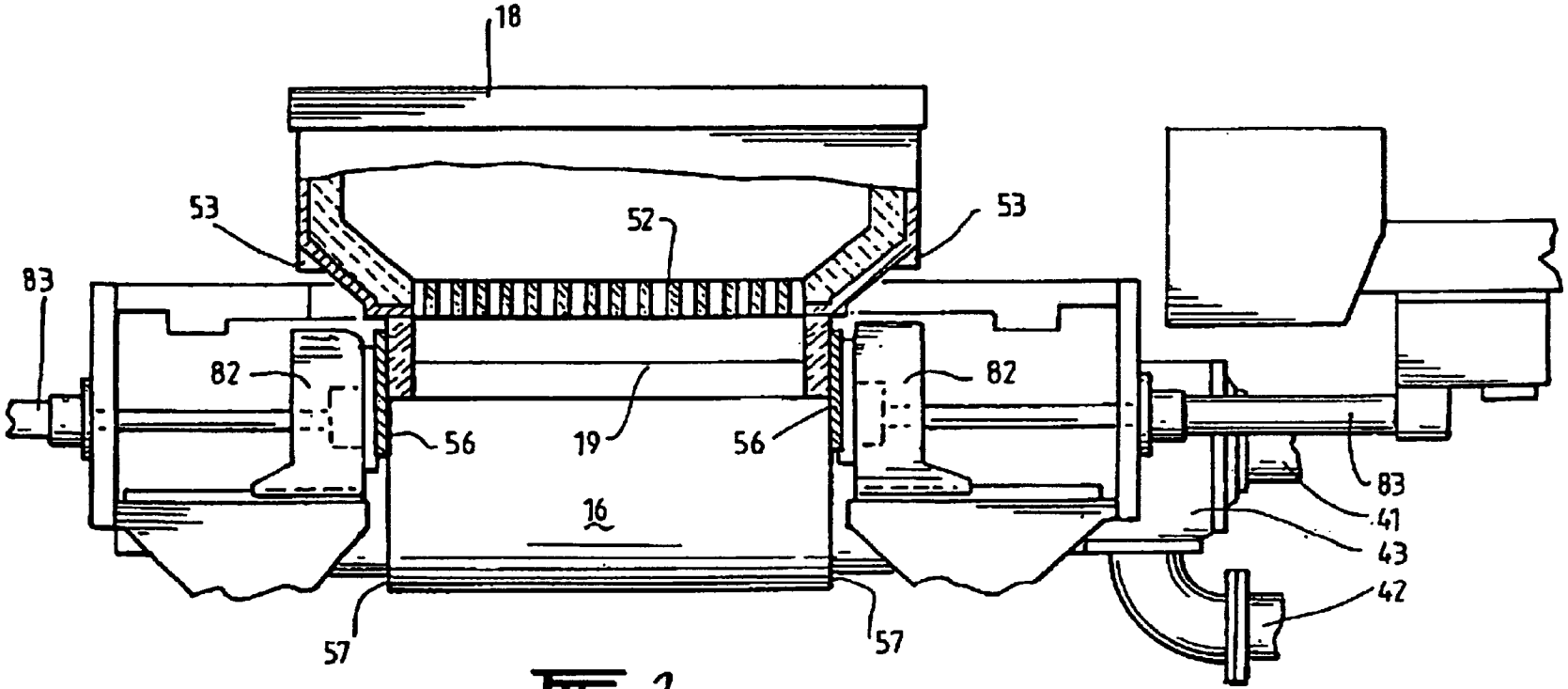
FIG. 3 is a longitudinal cross section through important parts of the caster.
Figure 4:
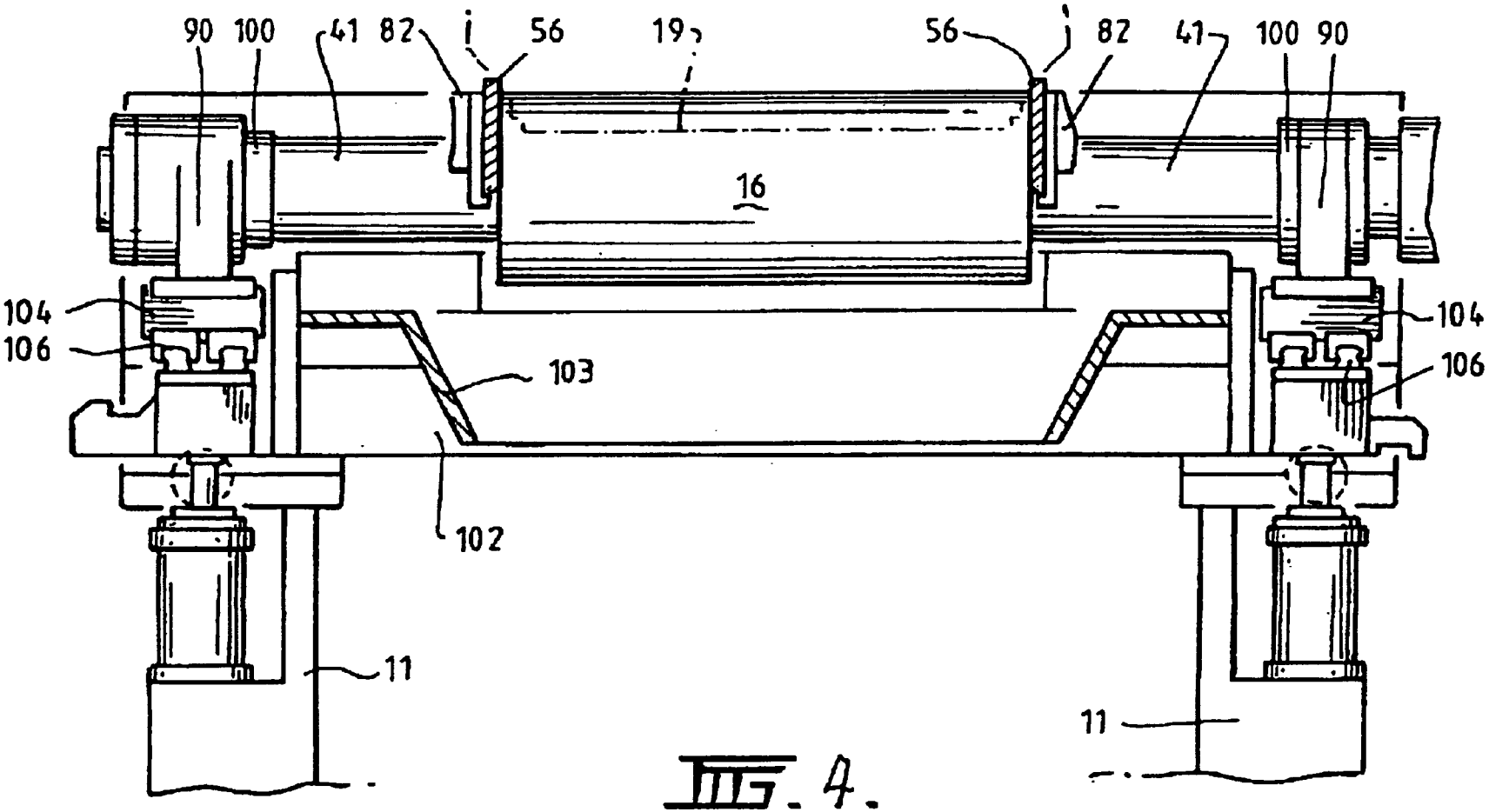
FIG. 4 is an end elevation of the caster.
Figure 5:
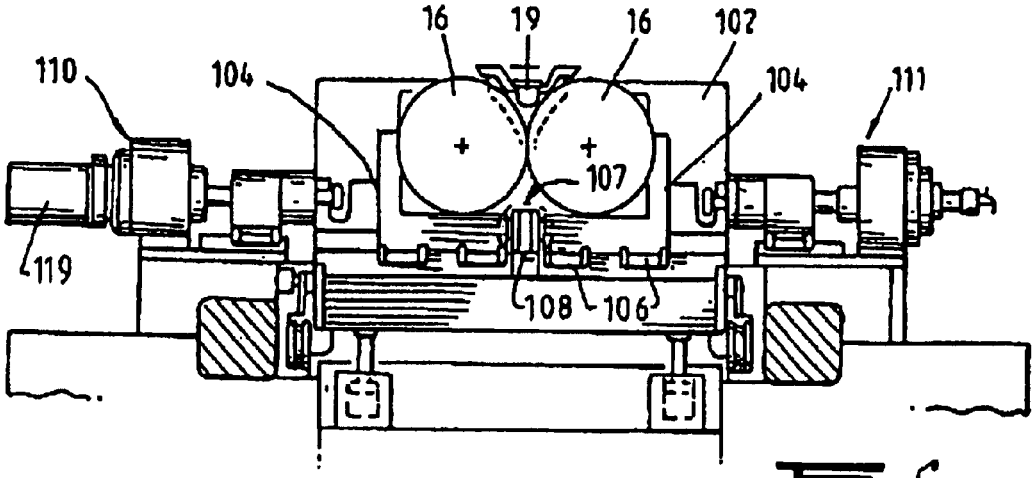
FIGS. 5, 6 and 7 show the caster in varying conditions during casting and during removal of the roll module from the caster.
Figure 6:
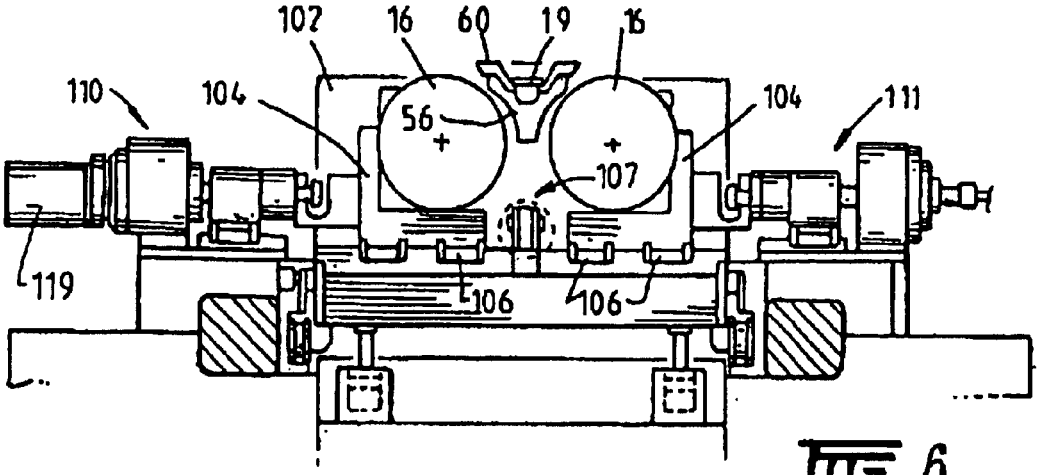
Figure 7:
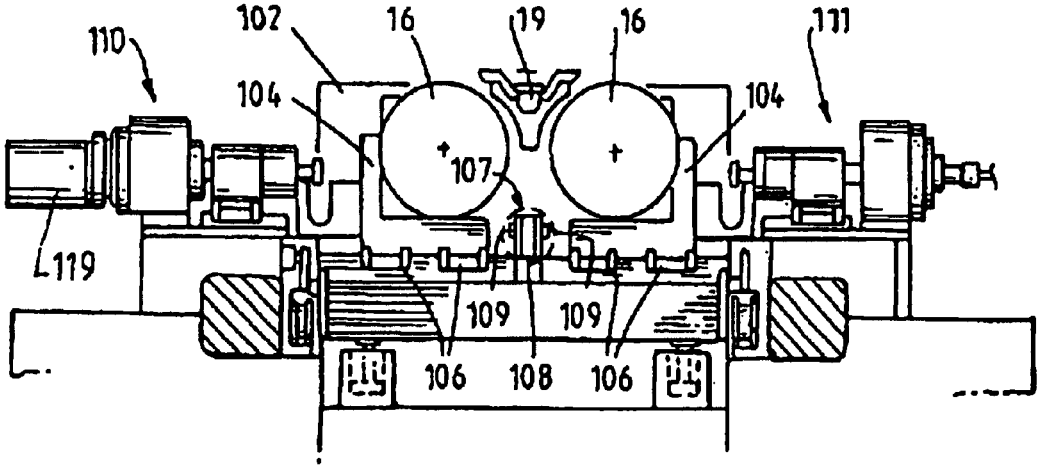

For the purposes of promoting an understanding of the principles of the invention, reference will now be made to the embodiments illustrated in the drawings and specific language will be used to describe same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The illustrated caster comprises a main machine frame 11 which stands up from the factory floor (not shown) and supports a casting roll module in the form of a cassette 13 which can be moved into an operative position in the caster as a unit but can readily be removed when the casting rolls are to be replaced. Cassette 13 carries a pair of parallel casting rolls 16 to which molten metal is supplied during a casting operation from a ladle (not shown) via a tundish 17, molten metal distributor 18 and delivery nozzle 19 to create a casting pool 30. Casting rolls 16 are water cooled so that shells solidify on the moving roll surfaces and are brought together at the nip 16A between them to produce a solidified strip product 20 below the roll nip. This product may be fed to a standard coiler.

Casting rolls 16 are contra-rotated through drive shafts 41 from an electric motor and transmission mounted on the main machine frame. The drive shaft can be disconnected from the transmission when the cassette is to be removed. Rolls 16 have copper peripheral walls formed with a series of longitudinally extending and circumferentially spaced water cooling passages supplied with cooling water through the roll ends from water supply ducts in the roll drive shafts 41 which are connected to water supply hoses 42 through rotary glands 43. The roll may typically be about 500 mm diameter and about 2000 mm long in order to produce strip product approximately the width of the rolls.

A ladle of a conventional construction is supported on a rotating turret, and a metal delivery system is provided by positioning the ladle over the tundish 17 to fill the tundish. The tundish may be fitted with a sliding gate valve 47 actuable by a servo mechanism to allow molten metal to flow from the tundish 17 through the valve 47 and refractory shroud 48 into molten metal distributor 18.

The distributor 18 may be formed as a wide dish made of a refractory material such as magnesium oxide (MgO). One side of the distributor 18 may receive molten metal from the tundish 17 and the other side of the distributor 18 may be provided with a series of longitudinally spaced metal outlet openings 52. The lower part of the distributor 18 carries mounting brackets 53 for mounting the distributor onto the main caster frame 11 when the cassette is installed in its operative position.

The metal delivery system also may have delivery nozzle 19 formed as an elongate body made of a refractory material such as alumina graphite. The lower part of nozzle 19 may be tapered so as to converge inwardly and downwardly so that it can project into the nip between casting rolls 16. Its upper part may be formed with outwardly projecting side flanges 55 which locate on a mounting bracket 60 which forms part of the main frame 11.

Delivery nozzle 19 may have a series of horizontally spaced generally vertically extending flow passages to produce a suitably low velocity discharge of molten metal throughout the width of the casting rolls and to deliver the molten metal into the nip between the casting rolls without direct impingement on the roll surfaces at which initial solidification occurs. Alternatively, delivery nozzle 19 may have a single continuous slot outlet to deliver a low velocity curtain of molten metal directly into the nip between the rolls. In either form, the nozzle 19 may be immersed in the molten metal pool.

The casting pool of molten metal is confined at the ends of the rolls by a pair of side closure plates 56 which are held against stepped ends 57 of the rolls when the roll cassette is in its operative position. Side closure plates 56, or dams are made of a strong refractory material, for example boron nitride, and have contoured edges to match the curvature of the stepped ends of the rolls. The side plates can be mounted in plate holders 82 which are movable by actuation of a pair of hydraulic cylinder units 83 to bring the side plates into engagement with the stepped ends of the casting rolls to form end closures for the molten pool of metal formed on the casting rolls during a casting operation and confine outflow of the casting pool of molten metal.

During a casting operation, the sliding gate valve 47 of the metal delivery system is actuated to allow molten metal to pour from the tundish 17 to the distributor 18 and through the metal delivery nozzle 19 whence it flows onto the casting rolls. The head end of the strip product 20 is guided by actuation of an apron table 96 to a pinch roll and thence to a coiling station (not shown). Apron table 96 hangs from pivot mountings 97 on the main frame and can be swung toward the pinch roll by actuation of a hydraulic cylinder unit (not shown) after the clean head end has been formed.

The removable roll cassette 13 is constructed as a module so that the casting rolls 16 can be set up and the nip between them adjusted before the cassette is installed in position in the caster. Moreover when the cassette is installed, a carrier drive system is provided with two pairs of carrier drive units 110, 111 mounted on the main machine frame 11 that can be rapidly connected to roll carriers on the cassette to provide forces resisting separation of the casting rolls. The carrier drives may be roll biasing units or servo-mechanisms.

Roll cassette 13 comprises a large frame 102 which carries the casting rolls 16, and upper part 103 of the enclosure for enclosing the cast strip below the nip. Casting rolls 16 are mounted on roll supports 104 which comprise a pair of roll end support structures 90 carrying roll end bearings 100 by which the rolls are mounted for rotation about their longitudinal axis in parallel relationship with one another. The two pairs of roll carriers 104 are mounted on the roll cassette frame 102 by means of linear bearings 106. Each pair of roll carriers 104 can slide laterally of the cassette frame to provide for bodily movement of the casting rolls toward and away from one another, permitting separation and closing movement between the two parallel casting rolls.

Roll cassette frame 102 also carries two adjustable stops 107 disposed beneath the casting rolls about a central vertical plane between the rolls and located between the two pairs of roll carriers 104, so as to serve as stops limiting inward movement of the two roll carriers to define the minimum width of the nip between the casting rolls. As explained below the roll carrier drives 110, 111 are actuable to move the roll carriers inwardly against these central adjustable stops, but to permit outward movement of one of the casting rolls against preset forces.

Each adjustable stop 107 may be in the form of a worm or screw driven jack having a body 108 fixed relative to the central vertical plane of the caster and two ends 109 which can be moved on actuation of the jack equally in opposite directions to permit expansion and contraction of the jack to adjust the width of the nip, while maintaining equidistant spacing of the casting rolls from the central vertical plane of the nip.

The carrier drive system is provided with two pairs of roll carrier drive units 110, 111 each connected to a roll carrier 104 at each end of a casting roll 16. The carrier drive units 110 at one side of the caster are constructed and operate to be capable of moving one of the roll carriers and in turn varying the thickness of the strip across the strip width at the nip. These drives are comprised of servo-mechanisms (not shown) or compressing springs 112 to provide lateral forces on the respective roll carriers 104. The carrier drives 111 at the other side of the caster move the roll carriers 104 supporting the other casting roll and incorporate hydraulic actuators 113. These actuators 113 are operable to hold the respective roll carriers 104 supporting one casting roll firmly against the central stops, while the other casting roll is free to move laterally with the action of the force of the servo-mechanism or compression springs 112 of the carrier drive units 110.

Figure 8:
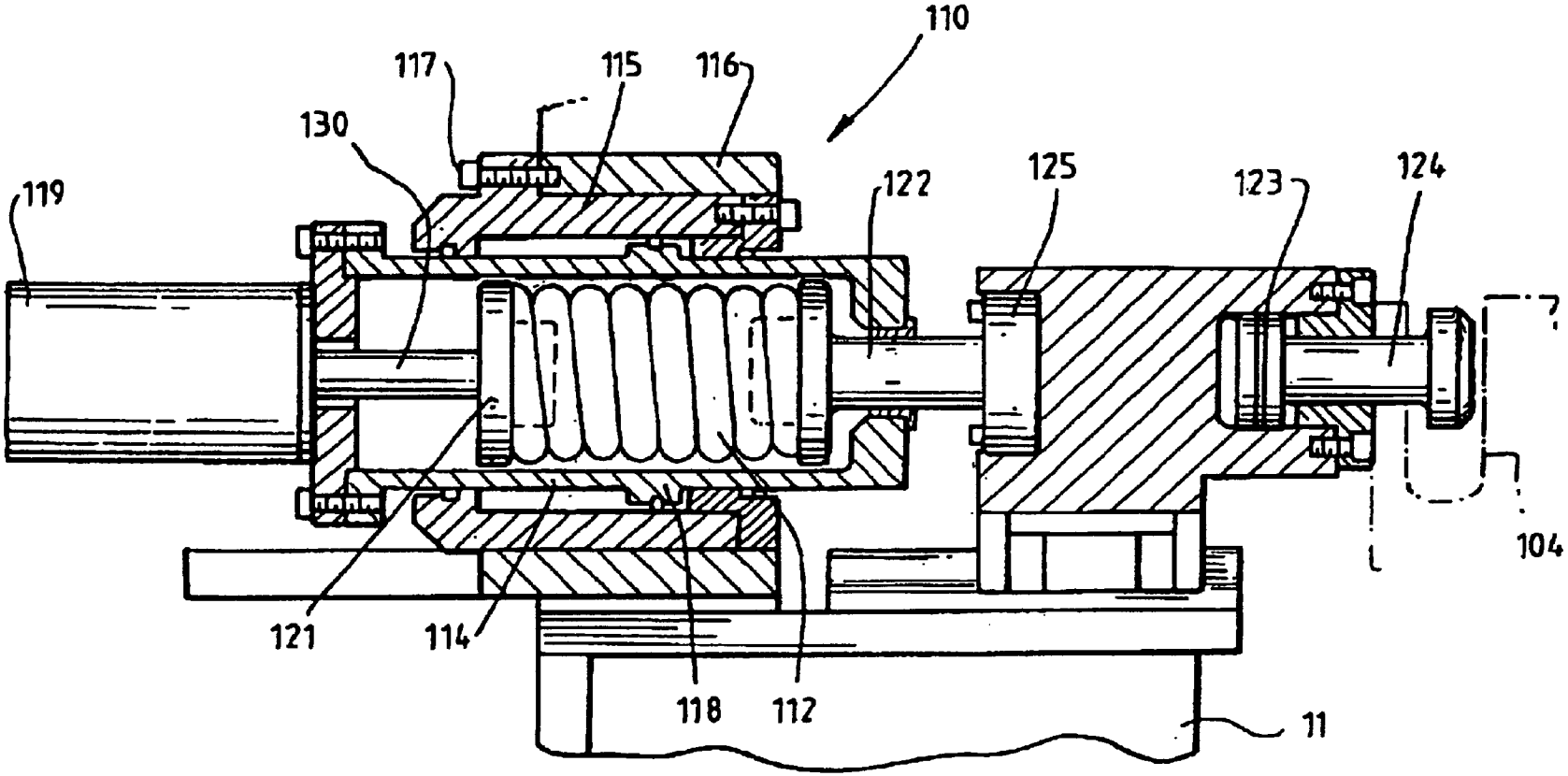
FIG. 8 is a vertical cross-section through a roll biasing unit incorporating a roll biasing spring.

The detailed construction of carrier drive units 110 are illustrated in FIG. 8, where units 110 are comprised of biasing units. As shown in that figure, each biasing unit comprises a compression spring 112 positioned in barrel housing 114 disposed within an outer housing 115, and is fixed to the main caster frame 116 by fixing bolts 117.

Spring housing 114 may be formed with a cylinder housing 118 positioned within the outer housing 115. Spring housing 114 may be set alternatively in an extended position as illustrated in FIG. 8 and a retracted position by flow of hydraulic fluid to and from the cylinder housing 118. The outer end of spring housing 114 carries a pressure fluid drive operable in the form of a hydraulic cylinder unit 119, and operable to set the position of a spring reaction plunger 121 connected to the piston of unit 119 by a connecting rod 130.

The other end of the compression spring 112 acts on a thrust transmission structure 122, which is connected to the respective roll carrier 104 through a load cell 125. The thrust structure is initially pulled into firm engagement with the roll carrier by a connector 124 which can be extended by operation of a hydraulic cylinder 123 when roll carrier drive units are to be disconnected.

When roll carrier drive units 110 are connected to the respective roll carrier 104 with the spring housing 114 set in its extended condition as shown in FIG. 8, the position of the spring housing 114 and cylinder unit 119 is fixed relative to the machine frame. The position of the spring reaction plunger 121 can be set to adjust the effective gap between the spring abutments on the reaction plunger 121 and the thrust transmission structure 122. The compression of the spring 112 can thereby be adjusted to vary the thrusting force applied to the thrust transmission structure 122 and the respective roll carrier 104. With this arrangement the only relative movement during casting operation is the movement of the roll carrier 104 and thruster structure 122 as a unit against the compression spring. Alternatively, the same force exerted by the compression spring on the roll carrier 104 can be exerted by a servo-mechanism. In either case, the force exerted by the roll carrier drives 110 on the roll carrier 104 inwardly against the stop can be adjusted to preload the roll carrier with a required inward force before metal strip actually passes between the casting rolls, and that force can be maintained during a subsequent casting operation.

In accordance with the present invention, dynamic wedge control is achieved by continual operation of the carrier drives to move the roll carriers 104 and in turn the ends of the supported casting roll, in turn varying the width of the nip between the casting rolls across the width of the strip at the nip. The continual operation of the carrier drives is provided by a control system capable of controlling the carrier drives responsive to electrical signals from sensors capable of producing electrical signals responsive to the strip thickness and positioned downstream of the nip as described below.

In accordance with the present invention, profile control is achieved by continual operation of the hydraulic cylinder unit [19] 119 of the roll biasing units to vary the position of the spring reaction plunger to replicate movements of the thrust transmission structure 122 due to variations in strip thickness and resulting lateral movements of the roll carrier 104. Any inward or outward movement of roll carrier 104 will cause a corresponding inward or outward movement of the cylinder of cylinder unit 119 and spring reaction plunger 121 so as to maintain a constant compression of the compression spring 112.

Accordingly, it is possible to maintain profile control by a substantially constant biasing force of the carrier 104 and in turn the supported casting roll regardless of movements of the roll mountings. This result is not achieved by endeavoring to control these forces generated by any pressure fluid system that was previously available. Such pressure fluid systems are generally too slow in response time to track the profile in strip thickness variations. The use of compression springs or servo-mechanisms in combination with a continual control setting device as explained herein enables very accurate setting of controlled forces which can be maintained or varied throughout a casting operation. The compression springs of the carrier drive units may be very low stiffness springs, or, alternatively, sensitive servo-mechanisms may be used because the two roll carrier drive units of the carrier drive system at the two ends of the laterally moveable casting roll operate independently so that there is no cross-talk between them.

Figure 9:
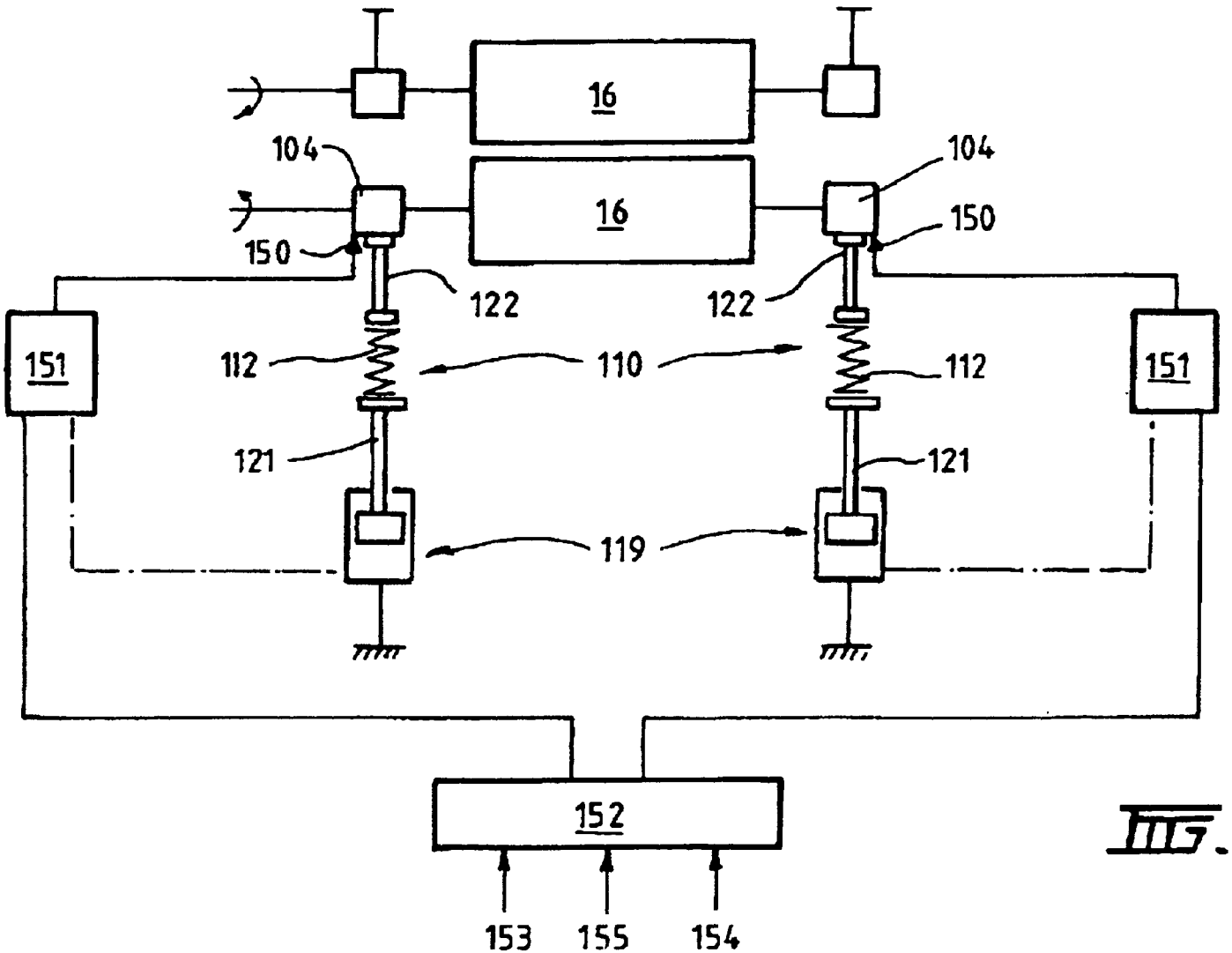
FIG. 9 is a schematic representation of essential components of the caster and control system.

As illustrated diagrammatically in FIG. 9, the control system for the profile control can be comprised of position sensors 150, sensing the position of the thrust transmission structures 122 and connected into a control circuit which controls the operation of the cylinder unit 119 so that the movements of the thrust transmission structures 122 are replicated by the cylinders of units 119. The control system may comprise controllers 151 connected to the position sensors 150 and to the cylinder units 119 to operate the cylinders 119 during casting so as to replicate movements of the thrust transmission structures 122. Controllers 151 may also receive input signals from a logic device 152 to allow operation of the cylinders for initial setting of the roll supports (input point 153) prior to casting. Subsequent adjustment for static wedge adjustment during casting (input point 154) can also be provided as explained below.

For dynamic wedge control, variations in strip thickness can be sensed by X-ray sensors positioned at a plurality of locations across the strip downstream from the caster, and configured to feed electrical signals indicative of strip thickness at the positions of the sensors to an input point 155 of the logic device 152 of the control system as indicated in FIG. 9. The sensors may alternatively be optical, laser or other sensors capable of sensing the thickness of the steel strip and producing electrical signals indicative of the strip thickness sensed by the sensor.

The thickness variations of the strip due to roll eccentricity or other deformation will be generally sinusoidal in the longitudinal direction of the strip, so as to produce sinusoidal control signals which can be used to control operation of cylinder units 119 to impose a corresponding and compensating sinusoidal movement of the roll carriers 104 and supported casting rolls by the carrier drives. To achieve appropriate strip thickness control, the control signals must be applied to the carrier drive units 110 in proper phase relationship with the rotation of the rolls, i.e., during each rotation the pattern of the control signals are matched with the pattern of roll end movements caused by the roll deformations. Proper phase matching is achieved by applying the signals at an initial phase relationship with a reference signal producing one pulse per revolution of the rolls and then varying the phase relationship to produce a minimization of the amplitude of thickness variations. This may be achieved by tracking or plotting an amplitude error signal. Superimposed of the sinusoidal variations can also be thickness variations across the width of the strip, which is known as a dynamic wedge.

The control system for dynamic wedge control may cause cylinder unit 119 to be operated to impose additional movements on the spring reaction plunger 121 to produce variations in the force to compensate for variations in strip thickness across the width of the strip, or at the corresponding edge of the strip due to deformation variations at the ends of the rolls during casting.

The construction units of biasing units 111 forms no part of the present invention. Full details of these units and the manner in which the roll cassette frame 102 can be moved into and out of the casting machine are described in U.S. Pat. No. 6,167,943 to Fish et al.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected.

What is claimed is:

1. In an apparatus for continuously casting metal strip where a pair of positioned casting rolls form a nip therebetween, a metal delivery system delivers molten metal into the nip between the casting rolls to form a casting pool of molten metal supported on casting roll surfaces above the nip confined against outflow adjacent the ends of the casting rolls, and a casting roll drive system drives the casting rolls in counter-rotational directions to produce a solidified strip of metal delivered downwardly from the nip, the improvement of controlling thickness of the strip against variation during casting comprising:

a. sensors positioned downstream of the nip capable of sensing the strip thickness at a plurality of locations along the strip width;

b. said sensors capable of producing electrical signals indicative of the strip thickness sensed at the sensor positions;

c. at least one of said casting rolls mounted on more than one roll [carriers alone] *carrier along* the strip width movable independently of another roll carrier and capable of allowing one of the casting rolls to move laterally toward and away from the other casting roll;

d. carrier drives capable of moving said roll carriers independently to enable the nip to be varied in a wedge-like shape and in turn varying the strip thickness across the strip width at the nip; and e. a control system capable of controlling the carrier drives responsive to electrical signals from the sensors to vary the nip across the strip width to at least partially correct for variations in the strip thickness along the strip width sensed by the sensors.

2. Apparatus for continuously casting metal strip as claimed in claim 1, wherein the carrier [drive system is] *drives are* comprised of servo-mechanisms capable of independently moving the roll carriers so as to vary the strip thickness across the strip width at the nip.

3. Apparatus for continuously casting metal strip as claimed in claim 1, wherein the carrier drive system is comprised of roll biasing units each acting on a roll carrier to bias a casting roll bodily toward the other casting roll so as to vary the strip thickness across the strip width at the nip.

4. Apparatus for continuously casting metal strip as claim in claim 3, wherein each roll biasing unit comprises thrust transmission structures connected to each roll carrier, compression springs acting against the thrust transmission structure to exert force on the thrust transmission structure and in turn the roll carrier, and a thrust reaction setting device operable to vary the lengths of the compression springs;

and wherein the control system controls operation of the thrust reaction setting device such that movement of the thrust transmission structure moves the roll carriers and in turn varies the strip thickness across the strip width at the nip.

5. Apparatus for continuously casting metal strip as claimed in claim 4, wherein each roll biasing unit further comprises a thrust reaction structure abutting the compression spring and moveable by the thrust reaction setting device such that the control system varies position of the thrust reaction structure to exert force through the compression spring on the thrust transmission structure and in turn vary the strip thickness across the strip width at the nip.

6. Apparatus as claimed in claim 1, wherein the carrier drives are disconnectable from the roll carriers to enable a module comprised of the casting roll and roll carrier to be removable without removing or dismantling the carrier drives.

7. In an apparatus for continuously casting metal strip where a pair of casting rolls form a nip between them, a metal delivery system delivers molten metal into the nip between the rolls to form a casting pool of molten metal supported on casting roll surfaces immediately above the nip confined against outflow adjacent the ends of the casting rolls, and a casting roll drive system drives the casting rolls in counter-rotational directions to produce a solidified strip of metal delivered downwardly from the nip, the improvement of controlling thickness variation of the strip along the strip width during casting comprising:

a. at least one of said casting rolls mounted on roll carriers capable of allowing one of the casting rolls to move laterally toward and away from the other casting roll;

b. roll biasing units each acting on the roll carrier adjacent each end of the casting rolls to bias the casting roll bodily toward the other casting roll;

c. each roll biasing unit comprising thrust transmission structures connected to the roll carriers adjacent each end of the casting rolls, compression springs acting against the thrust transmission structure to exert force on the thrust transmission structure and in turn the roll carriers adjacent each end of the casting roll;

d. a thrust reaction structure capable of compressing the compression spring and moveable axially of the compression spring;

e. a thrust reaction structure setting device operable to vary the position of the thrust reaction structure relative to the compression spring; and f. a control system capable of controlling operation of the thrust reaction structure setting device such that movements of the thrust reaction structure replicate movements of the thrust transmission structure such that movements of the thrust transmission structure do not significantly affect the biasing force imposed on the roll carrier and casting roll by the compression spring.

8. Apparatus as claimed in claim 7, wherein the setting device is a pressure fluid actuable drive acting between the thrust reaction structure and a fixed structure.

9. Apparatus as claimed in claim 8, wherein the fluid actuable drive comprises a fluid piston and cylinder unit connected at one end to the fixed structure, the other end of that unit either forming or being connected with the thrust reaction structure.

10. Apparatus as claimed in [claim 7] *claim 8*, wherein the control system comprises a position sensor to sense the position of the thrust transmission structure, and operates the pressure fluid actuable [device] *drive* such that a movement sensed by the sensor is replicated by movement of the thrust reaction structure.

11. Apparatus as claimed in claim 6, wherein the roll carriers comprise a pair of roll end support structures for each of the casting rolls disposed generally beneath the ends of the respective roll.

12. Apparatus as claimed in claim 11, wherein each pair of roll [and] *end* support structures carries journal bearings mounting the respective roll ends for rotation about a central roll axis.

13. Apparatus as claimed in claim 7, wherein the casting rolls and the roll carriers are mounted on a roll module installed in and removable from the [caster] *apparatus* as a unit.

14. Apparatus as claimed in claim 13, wherein the thrust transmission structure of each biasing unit is disconnectable from the respective roll carrier to enable a module comprising the casting roll and roll carrier to be removable without removing or dismantling the roll biasing units.

*15. In an apparatus for continuously casting metal strip where a pair of positioned casting rolls form a nip therebetween, a metal delivery system delivers molten metal into the nip between the casting rolls to form a casting pool of molten metal supported on casting roll surfaces above the nip confined against outflow adjacent the ends of the casting rolls, and a casting roll drive system drives the casting rolls in counter-rotational directions to produce a solidified strip of metal delivered downwardly from the nip, the improvement of controlling thickness of the strip against variation during casting comprising:*

*a. sensors positioned downstream of the nip capable of sensing the strip thickness;*

*b. said sensors capable of producing electrical signals indicative of the strip thickness sensed at the sensor positions;*

*c. at least one of said casting rolls mounted on more than one roll carrier along the strip width movable independently of another roll carrier and capable of allowing one of the casting rolls to move laterally toward and away from the other casting roll;*

*d. carrier drives capable of moving said roll carriers independently to superimpose a compensating sinusoidal phase matched movement of the casting rolls corresponding to variations of the strip thickness at the nip; and*

*e. a control system capable of controlling the carrier drives responsive to the electrical signals from the sensors to cause variation of the nip to at least partially correct for variations in strip thickness along the strip length sensed by the sensors.*

*16. Apparatus as claimed in claim 15 where the casting roll drive system is capable of generating a reference signal indicating rotational position of the casting rolls, and the control system capable of controlling the carrier drives to cause variation of the nip to at least partially correct for variations in the strip thickness along the strip length sensed by the sensors to be applied based on the reference signal.*

*17. Apparatus as claimed in claim 16 where the control system capable of controlling the carrier drives is capable of varying a phase of said variation of the nip to reduce amplitude of strip thickness variations.*

*18. Apparatus as claimed in claim 15 where the carrier drives are capable of varying the nip in a wedge-like shape and in turn varying the strip thickness across the strip width at the nip and the control system capable of controlling the carrier drives is capable of varying the nip across the strip width to at least partially correct for variations in the strip thickness along the strip width.*

* * * * *